US012604252B2

(12) United States Patent
Dai et al.

(10) Patent No.: US 12,604,252 B2
(45) Date of Patent: Apr. 14, 2026

(54) METHOD AND APPARATUS FOR MULTICAST AND BROADCAST SERVICES

(71) Applicant: Lenovo (Beijing) Limited, Beijing (CN)

(72) Inventors: Mingzeng Dai, Shanghai (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 237 days.

(21) Appl. No.: 18/250,043

(22) PCT Filed: Oct. 22, 2020

(86) PCT No.: PCT/CN2020/122709
§ 371 (c)(1),
(2) Date: Apr. 21, 2023

(87) PCT Pub. No.: WO2022/082567
PCT Pub. Date: Apr. 28, 2022

(65) Prior Publication Data
US 2023/0422136 A1 Dec. 28, 2023

(51) Int. Cl.
*H04W 4/00* (2018.01)
*H04W 36/00* (2009.01)
*H04W 36/36* (2009.01)

(52) U.S. Cl.
CPC ..... *H04W 36/362* (2023.05); *H04W 36/0007* (2018.08)

(58) Field of Classification Search
CPC ........... H04W 36/362; H04W 36/0007; H04W 36/24
See application file for complete search history.

(56) References Cited

U.S. PATENT DOCUMENTS

2018/0279193 A1    9/2018  Park et al.
2021/0360495 A1*  11/2021  Lovlekar ............ H04W 36/305
(Continued)

FOREIGN PATENT DOCUMENTS

CN      107889145 A    4/2018
CN      110268746 A    9/2019
(Continued)

OTHER PUBLICATIONS

Intel Corporation , "Running CR for the introduction of NR mobility enhancement", 3GPP TSG-RAN WG2 Meeting #107, R2-1911559, Prague, Czech Republic, Aug. 2019, 18 pages.
(Continued)

*Primary Examiner* — Abdelnabi O Musa
(74) *Attorney, Agent, or Firm* — FIG. 1 Patents

(57) ABSTRACT

Embodiments of the present application are related to a method and apparatus for multicast and broadcast services (MBS). According an embodiment of the present application, an exemplary method includes: receiving conditional handover (CHO) configuration information, wherein the CHO configuration information indicates a set of execution conditions for a set of candidate cells, each execution condition being associated with a candidate cell; and executing a CHO procedure to a target cell of the set of candidate cells in response to at least one of the set of execution conditions is met, wherein the target cell is determined based on the set of execution conditions and MBS information associated with CHO.

20 Claims, 9 Drawing Sheets

(56) References Cited

U.S. PATENT DOCUMENTS

| | | | |
|---|---|---|---|
| 2022/0046687 A1* | 2/2022 | Shrivastava .......... | H04W 72/30 |
| 2022/0225192 A1 | 7/2022 | Yang | |
| 2023/0232300 A1* | 7/2023 | Awada .............. | H04W 36/0005 |
| | | | 370/331 |
| 2023/0328629 A1* | 10/2023 | Fujishiro ................ | H04L 45/22 |
| | | | 370/328 |
| 2023/0388866 A1* | 11/2023 | Di Gorolamo ... | H04W 36/0007 |
| 2024/0098588 A1* | 3/2024 | Da Silva .............. | H04W 24/10 |
| 2024/0098610 A1* | 3/2024 | Min ...................... | H04W 36/30 |
| 2024/0147330 A1* | 5/2024 | Min ................... | H04W 36/362 |

FOREIGN PATENT DOCUMENTS

| | | | |
|---|---|---|---|
| CN | 111294875 A | 6/2020 | |
| CN | 111654881 A | 9/2020 | |
| CN | 111800835 A | 10/2020 | |
| WO | 2020087432 A1 | 5/2020 | |

OTHER PUBLICATIONS

Qualcomm Inc , "NR Multicast mobility enhancements with service continuity", 3GPP TSG-RAN WG2 Meeting #111e, R2-2006796, E-Meeting, Aug. 2020, 4 pages.

Lenovo , "Overview on NG RAN to support NR Multicast and Broadcast Services", 3GPP TSG-RAN WG3 Meeting #109e, R3-204920, Online [retrieved May 23, 2023]. Retrieved from the Internet <https://www.3gpp.org/ftp/TSG_RAN/ WG3_lu/TSGR3_109-e/Docs/>., Aug. 2020, 4 Pages.

PCT/CN2020/122709 , "International Preliminary Report on Patentability", PCT Application No. PCT/CN2020/122709, May 4, 2023, 5 pages.

PCT/CN2020/122709 , "International Search Report and Written Opinion", PCT Application No. PCT/CN2020/122709, Jul. 22, 2021, 6 pages.

European Search Report—20958150.3—13 pages—Jun. 28, 2024—Application No. 20958150.3.

* cited by examiner

METHOD AND APPARATUS FOR MULTICAST AND BROADCAST SERVICES

TECHNICAL FIELD

Embodiments of the present application generally relate to wireless communication technology, especially to a method and apparatus for multicast and broadcast services (MBS).

BACKGROUND

In new radio (NR) Rel-17, MBS plans to focus on a small area mixed mode multicast (also referred to as Objective A in the TR 23.757). The Objective A is about enabling general MBS services over 5G system (5GS) and the identified use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IoT) applications. In these use cases, the requirements for service continuity and reliability have changed. In order to support the above requirements, one objective introduced in RP-201038 is: specify support for dynamic change of Broadcast/Multicast service delivery between multicast (e.g., point to multipoint (PTM) mode) and unicast (e.g., point to point (PTP) mode) with service continuity for a given user equipment (UE).

Meanwhile, in RAN2 #111 meeting, it was agreed that handover including variants will be supported. However, RAN2 #111 only assumes that for Rel-17 NR multicast mobility in connected mode, handover (including variants) is the baseline, which variants are for MBS needs to be to further defined.

Thus, an improved technical solution for MBS should be seriously considered in view of handover including variants, e.g., conditional handover (CHO).

SUMMARY OF THE DISCLOSURE

One objective of the present application is to provide a method and apparatus for MBS, especially a method and apparatus for MBS supporting CHO.

According to some embodiments of the present application, an exemplary method may include: receiving CHO configuration information, wherein the CHO configuration information indicates a set of execution conditions for a set of candidate cells, each execution condition being associated with a candidate cell; and executing a CHO procedure to a target cell of the set of candidate cells in response to at least one of the set of execution conditions is met, wherein the target cell is determined based on the set of execution conditions and MBS information associated with CHO.

In some embodiments of the present application, the MBS information associated with CHO is a cell list for MBS, including at least one of the following: a list of cells supporting MBS; a list of cells with ongoing MBS session(s); a list of cells with MBS service/session area identity(s) (SAI)(s); and a list of cells where ongoing MBS session(s) provided in current cell(s) is also provided. An exemplary method may further include: receiving the MBS information associated with CHO via a message for MBS configuration. In another exemplary method, the set of candidate cells are determined based on the MBS information associated with CHO, and the target cell is determined from the set of candidate cells based on the set of execution conditions.

In some other embodiments of the present application, the MBS information associated with CHO is information on at least one of MBS session and MBS bearer associated with each candidate cell, indicating at least one of the following: whether ongoing MBS session(s) is admitted by a candidate cell; whether ongoing MBS bearer(s) is admitted by the candidate cell; whether the ongoing MBS session(s) is kept in the candidate cell; and whether the ongoing MBS bearer(s) is kept in the candidate cell. An exemplary method may further include: receiving the MBS information associated with CHO via a message for the CHO configuration information. In another exemplary method, the set of candidate cells are determined based on the MBS information associated with CHO, and the target cell is determined from the set of candidate cells based on the set of execution conditions.

In some yet other embodiments of the present application, the MBS information associated with CHO is system information block (SIB) or multicast control channel (MCCH) received from different cells.

According to some embodiments of the present application, an exemplary method may include: determining MBS information associated with CHO; and transmitting CHO configuration information, wherein the CHO configuration information indicates a set of execution conditions for the set of candidate cells, each execution condition being associated with a candidate cell.

In some embodiments of the present application, the MBS information associated with CHO is a cell list for MBS including at least one of the following: a list of cells supporting MBS; a list of cells with ongoing MBS session(s); a list of cells with MBS SAI(s); and a list of cells where ongoing MBS session(s) provided in current cell(s) is also provided. An exemplary may further include: transmitting the MBS information associated with CHO via a message for MBS configuration. Another exemplary method may include: determining the set of candidate cells based on the MBS information associated with CHO.

In some other embodiments of the present application, the MBS information associated with CHO is information on at least one of MBS session and MBS bearer associated with each candidate cell, indicating at least one of the following: whether ongoing MBS session(s) is admitted by a candidate cell; whether ongoing MBS bearer(s) is admitted by the candidate cell; whether the ongoing MBS session(s) is kept in the candidate cell; and whether the ongoing MBS bearer(s) is kept in the candidate cell. An exemplary method may further include: transmitting the MBS information associated with CHO via a message for transmitting the CHO configuration information. Another exemplary method may include: determining the set of candidate cells based on the MBS information associated with CHO.

In some yet other embodiments of the present application, an exemplary method may include: receiving the MBS information associated with CHO from base stations of the set of candidate cells, or from operations, administration and maintenance (OAM).

In addition, an embodiment of the present application also provides an apparatus for performing a method according to an embodiment of the present application, e.g., a method as stated above. An exemplary apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application can solve the technical problems on supporting CHO in MBS, reducing MBS service interruption due to handover, and will facilitate the deployment and implementation of the NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE), and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
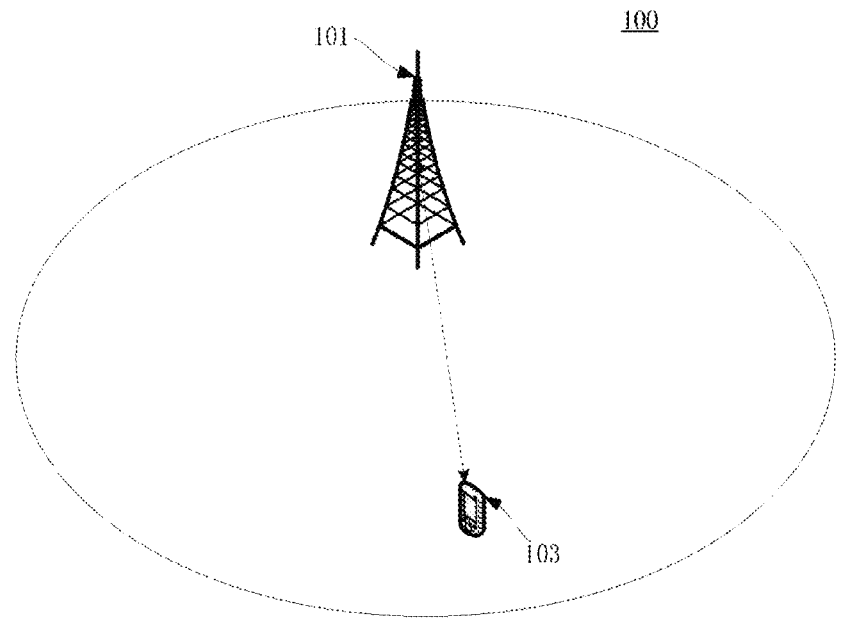
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a BS 101 and a UE 103. Although merely one BS is illustrated in FIG. 1 for simplicity, it is contemplated that the wireless communication system 100 may include more BS s in some other embodiments of the present application. Similarly, although merely one UE is illustrated in FIG. 1 for simplicity, it is contemplated that the wireless communication system 100 may include more UEs in some other embodiments of the present application.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE 103 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 103 may include wearable devices, such as smart watches, fitness bands, optical head-mounted displays, or the like. Moreover, the UE 103 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In NR Rel-17, MBS was introduced to focus on a small area mixed mode multicast. According to RAN2 #111, handover including variants will be supported for Rel-17 NR multicast mobility in connected mode. CHO is a handover variant introduced in Rel-16. Different from the traditional handover, CHO is defined as a handover that is executed by the UE when one or more handover execution conditions are met.

Figure 2:
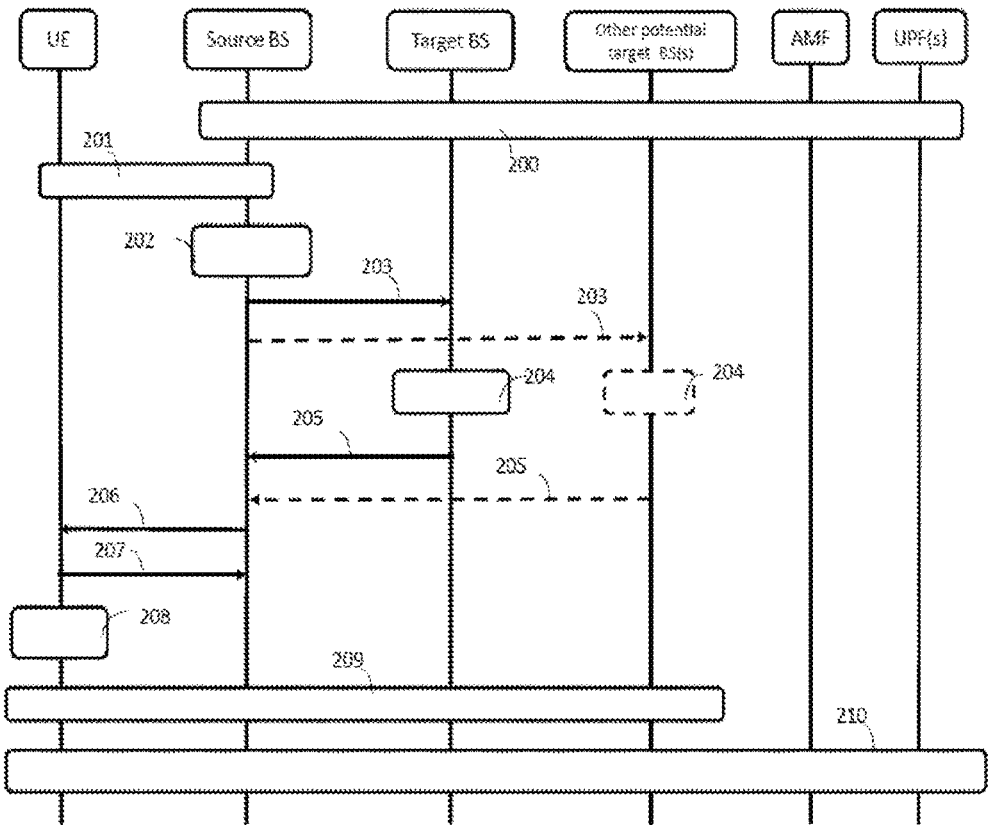
FIG. 2 illustrates a flowchart of an exemplary legacy CHO procedure.

For example, FIG. 2 illustrates a flowchart of an exemplary legacy CHO procedure. As shown in FIG. 2, it depicts a basic CHO scenario where neither the access and mobility management function (AMF) nor the user plane functions (UPFs) changes.

Referring to FIG. 2, in step 200, an AMF may provide the UE context of a UE, e.g., the UE 103 to a BS, e.g., the BS 101. The BS receiving the UE context is referred to as the source BS for the UE. The UE context may contain information regarding roaming and access restrictions of the UE.

In step 201, the source BS may transmit measurement configuration information to the UE. The UE will perform measurement, e.g., reference signal receiving power (RSRP) measurement based on the measurement configuration information, and report the measurement result to the source BS.

In step 202, the source BS may decide to use a CHO for the UE based on the measurement result reported by the UE.

In step 203, the source BS may transmit a CHO request message to one or more candidate BSs. For example, the one or more candidate BSs may include a target BS and other potential target BS(s).

In step 204, the target BS and other potential target BS(s) may perform admission control to decide whether to allow the CHO of the UE after receiving the CHO request message from the source BS.

In step 205, based on the admission control result, at least one of the target BS and other potential target BS(s) may transmit a CHO response message to the source BS. The CHO response message may include CHO configuration for one or more candidate cells.

In step 206, the source BS may transmit a radio resource control (RRC) reconfiguration message to the UE. The RRC reconfiguration message may include CHO configuration information indicating a set of CHO configurations and a set of execution conditions for a set of cells, each cell is associated with a CHO configuration and an execution condition. The set of cells may include the one or more candidate cells provided by at least one of the target BS and other potential target BS(s).

The CHO configuration associated with a cell may include parameters for the UE to perform handover to the cell. For example, the CHO configuration associated with a cell may include parameters for the UE to access the cell and/or perform data transmission with the cell.

The execution condition may include one or two trigger conditions. For example, in the case that the execution condition includes one trigger condition, the trigger condition may be an A3 event or an A5 event as specified in 3GPP standard document TS38.331. In the case that the execution condition includes two trigger conditions, the two trigger conditions may be an A3 event and an A5 event as specified in 3GPP standard document TS38.331. In addition, only a single reference signal (RS) type may be used for evaluating the execution condition of a single cell and at most two different execution quantities can be configured simultaneously for evaluating the execution condition of a single cell. For example, the two different execution quantities may be RSRP and reference signal receiving quality (RSRQ), or RSRP and signal to interference plus noise ratio (SINR), or the like. In some embodiments of the present application, more than one execution condition may be satisfied, that is, more than one cell is suitable for the UE's handover. In this case, the UE can select a cell for performing CHO based on the execution quantity.

After receiving the RRC reconfiguration message, in step 207, the UE may transmit a RRC reconfiguration complete message to the source BS.

In step 208, the UE may maintain the connection with the source BS and start evaluating the set of execution conditions for the set of cells. Before any execution condition is satisfied, when receiving a handover (HO) command without CHO configuration, the UE may perform the HO procedure regardless of any previously received CHO configuration information. Otherwise, in the case that at least one execution condition for at least one candidate cell is satisfied, in step 209, the UE may detach from the source BS and execute (or perform, or apply) a CHO procedure to a cell selected from the at least one cell. The selected cell may be referred to as a target cell.

Performing a CHO procedure to the selected cell may include applying the corresponding CHO configuration for the selected cell. When performing the CHO procedure, e.g., from the time when the UE starts synchronization with the selected cell, the UE does not monitor the source BS anymore. The UE may complete the CHO procedure by transmitting a RRC reconfiguration complete message to the target cell.

In step 210, the UE, the source BS, the target BS, and the core network (e.g., AMF and/or UPF(s)) may perform data forwarding and path switch.

Apparently, the current execution conditions for CHO do not include any condition associated with MBS. For a UE being receiving MBS services (or MBS bearers), when it decides to execute a CHO procedure, there may be no MBS service (or MBS bearers) being supported or transmitted at all in the target cell. In some scenarios, there may be some MBS sessions (or MBS bearers) supported or transmitted in the target, all or part of the MBS sessions (or MBS bearers) are not the ongoing MBS sessions (or MBS bearers) on the UE before the CHO. Accordingly, when the UE performs a handover to the target cell, the MBS reception will be interrupted, which cannot satisfy a basic function requirement for broadcast/multicast for UEs in RRC_CONNECTED state, i.e., basic mobility with service continuity. In some other scenarios, the UE may be not receiving MBS service, but is interested in MBS service and desire a handover to a target cell providing MBS.

At least for solving the above technical problems, embodiments of the present application propose an improved technical solution for MBS. For persons skilled in the art, handover may also mean a handover from a frequency to another frequency. Although the following embodiments are illustrated only concerning on handover between different cells, the "cell" can be replaced with "frequency." Thus, when defining the reasonable protection scope of the present application, the terminology "cell" in the present application should cover legacy cell and legacy frequency.

Figure 3:
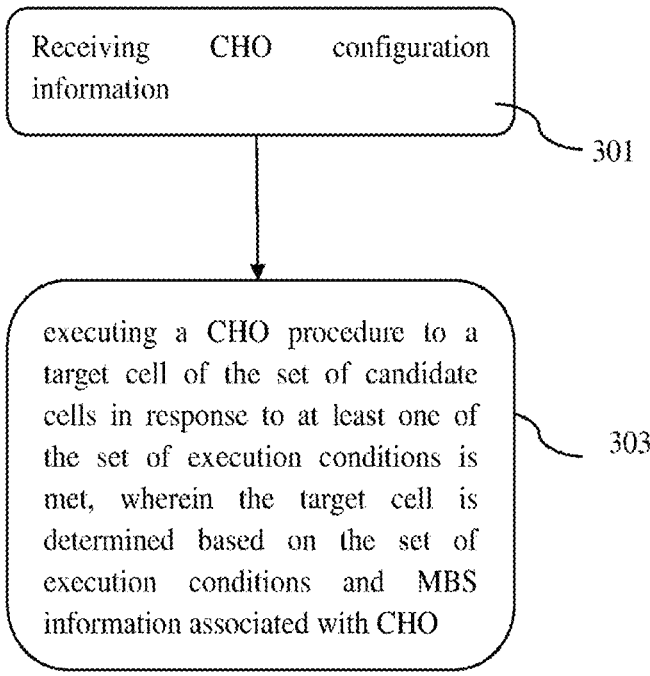
FIG. 3 is a flow chart illustrating an exemplary method for MBS according to some embodiments of the present application.

FIG. 3 is a flow chart illustrating an exemplary method for MBS according to some embodiments of the present application, which can be performed in the remote side, e.g., by a UE 103 or the like.

As shown in FIG. 3, in step 301, CHO configuration information may be received in the remote side, e.g., by the UE 103. According to some embodiments of the present application, the CHO configuration information is received via a RRC reconfiguration message from the source BS, e.g. by which the UE 103 is served. The CHO configuration information indicates a set of execution conditions for a set of candidate cells, each execution condition being associated with a candidate cell. The set of candidate cells include one or more potential target cells for CHO.

After receiving the CHO configuration information, the UE may maintain the connection with the source BS and start evaluating the set of execution conditions for the set of candidate cells. Before any execution condition is met, when receiving a HO command without CHO configuration, the UE may perform the HO procedure regardless of any previously received CHO configuration information. Otherwise, in step 303, the UE may execute a CHO procedure to a target cell of the set of candidate cells in response to at least one of the set of execution conditions is met. The target cell is determined (or selected) based on the set of execution conditions and MBS information associated with CHO.

In some embodiments of the present application, the MBS information associated with CHO is a cell list for MBS including at least one of the following: a list of cells supporting MBS; a list of cells with ongoing MBS session(s); a list of cells with MBS SAI(s); and a list of cells where ongoing MBS session(s) provided in current cell(s) is also provided. An exemplary method may further include: receiving the MBS information associated with CHO via a message for MBS configuration from the source BS, e.g., a RRC signaling indicating dedicated MBS configuration for the UE. In some other embodiments of the present application, the cell list for MBS may be received via another message from the source BS. When determining the target cell from the set of candidate cells, the UE will consider the MBS information associated with CHO besides the set of execution conditions, e.g., prioritizing cell(s) in the cell list for MBS. In another exemplary method, the set of candidate cells indicated in the CHO configuration information are determined based on the MBS information associated with CHO firstly, e.g., in the source BS. When determining the target cell from the set of candidate cells, the UE only needs to consider the set of execution conditions as legacy technology.

In some other embodiments of the present application, the MBS information associated with CHO is information on at least one of MBS session and MBS bearer associated with each candidate cell, indicating at least one of the following: whether ongoing MBS session(s) is admitted by a candidate cell; whether ongoing MBS bearer(s) is admitted by the candidate cell; whether the ongoing MBS session(s) is kept in the candidate cell; and whether the ongoing MBS bearer(s) is kept in the candidate cell. An exemplary method may further include: receiving the MBS information associated with CHO via a message for the CHO configuration information from the source BS, e.g., a RRCReconfiguration message. In some other embodiments of the present application, the cell list for MBS may be received via another message from the source BS. When determining the target cell from the set of candidate cells, the UE will consider the MBS information associated with CHO besides the set of execution conditions, e.g., prioritizing cell(s) admitting ongoing MBS session(s) or admitting ongoing MBS bearer(s) etc. In another exemplary method, the set of candidate cells indicated in the CHO configuration information are determined based on the MBS information associated with CHO firstly, e.g., in the source BS. When determining the target cell from the set of candidate cells, the UE only needs to consider the set of execution conditions as legacy technology.

In some yet other embodiments of the present application, the MBS information associated with CHO is SIB or MCCH received from different cells. The received SIB or MCCH means that the associated cell(s) is transmitting MBS service(s). The cell(s) where the SIB or MCCH is received may be the same as or be different from the candidate cells indicated in the CHO configuration information. When determining the target cell from the set of candidate cells, the UE will consider the MBS information associated with CHO besides the set of execution conditions, e.g., prioritizing cell(s) from which SIB or MCCH is received.

Figure 4:
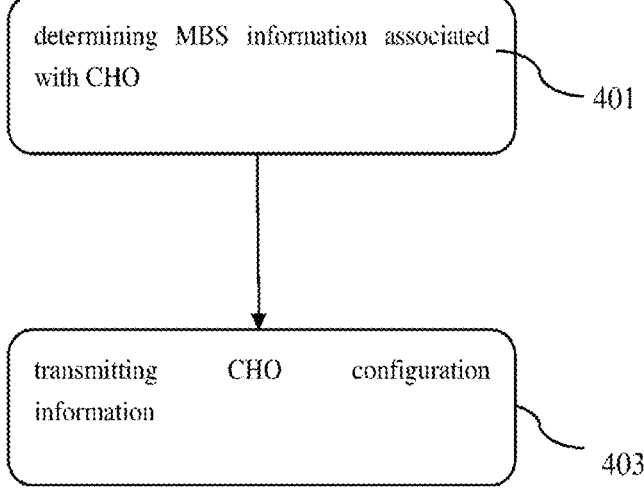
FIG. 4 is a flow chart illustrating an exemplary method for MBS according to some other embodiments of the present application.

On the network side, a similar procedure can be performed. For example, FIG. 4 is a flow chart illustrating an exemplary method for MBS according to some other embodiments of the present application, which can be performed in the network side, e.g., by a source BS or the like. Considering the consistency between the network side and UE side, the exemplary procedure will be briefly illustrated in the network side.

As shown in FIG. 4, in step 401, MBS information associated with CHO is determined in the source BS. In some embodiments of the present application, the MBS information associated with CHO is a cell list for MBS including at least one of the following: a list of cells supporting MBS; a list of cells with ongoing MBS session(s); a list of cells with MBS SAI(s); and a list of cells where ongoing MBS session(s) provided in current cell(s) is also provided. In some other embodiments of the present application, the MBS information associated with CHO is information on at least one of MBS session and MBS bearer associated with each candidate cell, indicating at least one of the following: whether ongoing MBS session(s) is admitted by a candidate cell; whether ongoing MBS bearer(s) is admitted by the candidate cell; whether the ongoing MBS session(s) is kept in the candidate cell; and whether the ongoing MBS bearer(s) is kept in the candidate cell.

According to some embodiments of the present application, the MBS information associated with CHO can be received from BS(s) of the set of candidate cells or OAM. For example, a source BS may receive MBS information from a neighbor BS providing at least one cell via a Xn message, which indicates at least one of the following: e.g., whether a cell supports MBS, whether the cell has ongoing MBS session(s), whether the cell has MBS SAI(s); whether the cell also provides ongoing MBS session(s) provided in current cell(s). In another embodiments of the present application, a source BS may receive MBS service (and/or bearer) configuration information from a neighbor BS providing at least one cell via a Xn message, which indicates at least one of the following: e.g., whether ongoing MBS session(s) is admitted by a cell; whether ongoing MBS bearer(s) is admitted by the cell; whether the ongoing MBS session(s) is kept in the cell; and whether the ongoing MBS bearer(s) is kept in the cell. The cell may be selected as a candidate cell for CHO. Based on the received MBS service (and/or bearer) configuration information associated with each cell, the source BS may determine the MBS information associated with CHO.

In step 403, CHO configuration information may be transmitted to the UE. The CHO configuration information indicates a set of execution conditions for a set of candidate cells, each execution condition being associated with a candidate cell. The set of candidate cells include one or more potential target cells for CHO.

In some embodiments of the present application, the source BS may also transmit the MBS information associated with CHO to the UE so that the UE can use the MBS information associated with CHO for determining the target cell. For example, the source BS may transmit a cell list for MBS to the UE via a message for MBS configuration. In another example, the source BS may transmit information on at least one of MBS session and MBS bearer associated with each candidate cell to the UE via a message for the CHO configuration information.

In some other embodiments of the present application, the source BS may use the MBS information associated with CHO for selecting (determining) the set of candidate cells for the UE. The MBS information may not be transmitted to the UE so save overhead. When determining the target cell from the set of candidate cells, the UE only needs to consider the set of execution conditions as legacy technology.

Based on the above basic solution, more details will be illustrated in various embodiments hereafter. Besides the following embodiments, persons skilled in the art should understand that: based on the legacy CHO procedure and the basic solution of the present application, various embodiments of the present application can be made for MBS under the teaching and suggestion of the present application. In addition, although the following embodiments are illustrated in sequence, that does not mean these steps must be performed in the sequence illustrated herein.

Figure 5:
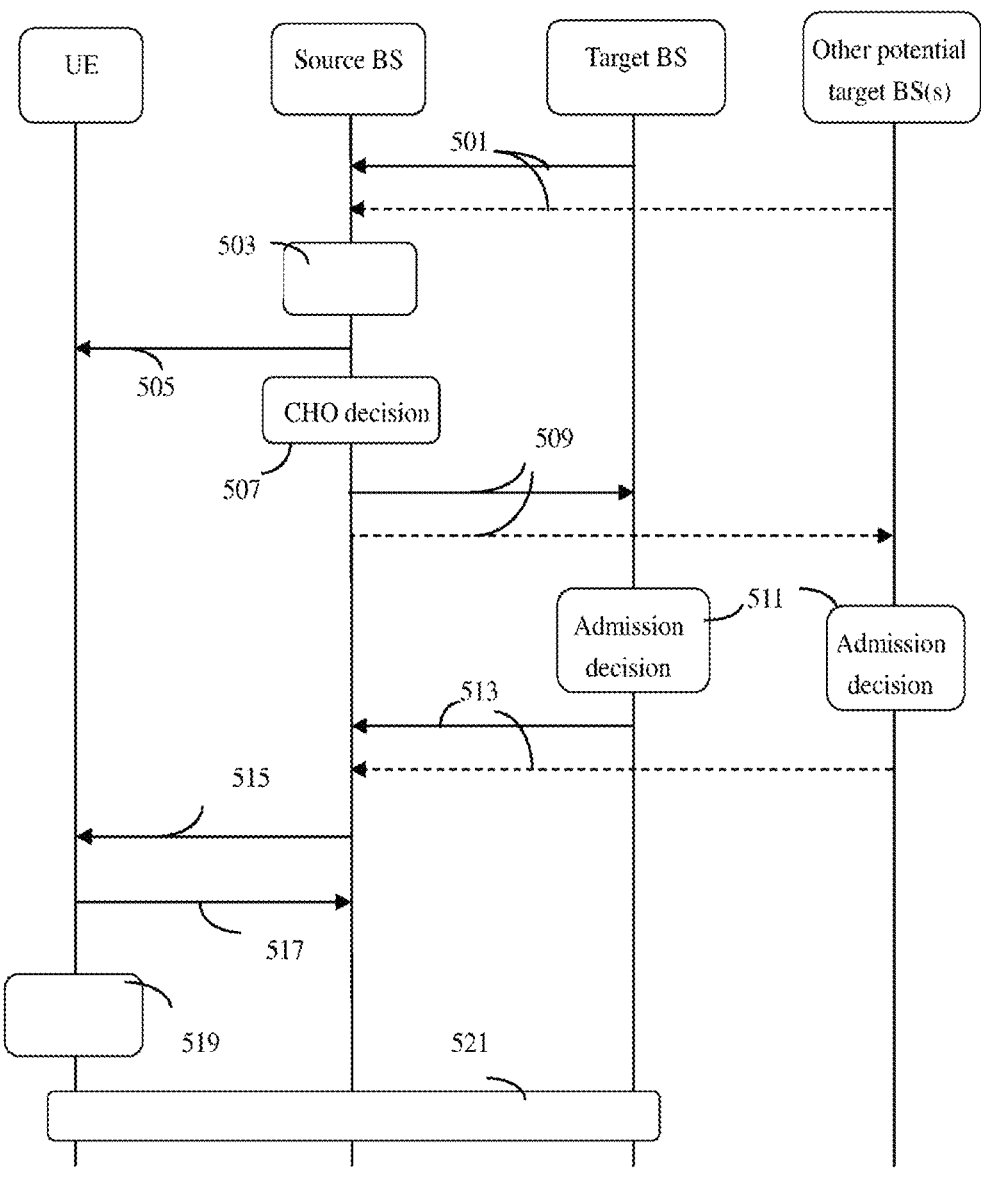
FIG. 5 is a flow chart illustrating an exemplary CHO procedure for multicast mobility in connected mode according to some embodiments of the present application.

FIG. 5 is a flow chart illustrating an exemplary CHO procedure for multicast mobility in connected mode according to some embodiments of the present application. Although the method is illustrated in a system level by a UE in a remote side (or UE side) and a plurality of BS in a network side (or BS side), persons skilled in the art can understand that the method implemented in the remote side and that implemented in the network side can be separately implemented and incorporated by other apparatus with the like functions.

Referring to FIG. 5, the source BS is assumed to be a BS by which the UE is served. In step 501, the source BS may receive MBS information from one or more neighbor BS s, which provide one or more neighbor cells. A set of candidate cells for CHO including a target cell (to be determined during a CHO procedure) and other potential target cell(s) will be determined or selected from the one or more neighbor cells. For simplicity, only the target BS of the target cell and one potential target BS of at least one potential target cell are shown in FIG. 5. Persons skilled in the art should understand that there may be more potential target BS or no other potential target BS. In some embodiments of the present application, the source BS may receive MBS information from a neighbor BS associated with a neighbor cell via a Xn message, which indicates at least one of the following: e.g., whether the neighbor cell supports MBS, whether the neighbor cell has ongoing MBS session(s), whether the neighbor cell has MBS SAI(s); whether the neighbor cell also provides ongoing MBS session(s) provided in current cell(s).

Based on the received MBS information, the source BS may determine the MBS information associated with CHO in step 503. In some embodiments of the present application, the source BS may acquire (or receive) the MBS information of each neighbor cell from OAM. The received or acquired MBS information can be directly used as MBS information associated with CHO in some embodiments of the present application. In some other embodiments of the present application, the source BS may derive the MBS information associated with CHO from the received or acquired MBS information. An exemplary MBS information associated with CHO is a cell list for MBS including at least one of the following: a list of cells supporting MBS; a list of cells with ongoing MBS session(s); a list of cells with MBS SAI(s); and a list of cells where ongoing MBS session(s) provided in current cell(s) is also provided.

In step 505, the source BS may transmit the cell list for MBS to the UE, e.g., via a message for MBS configuration. In some embodiments of the present application, the cell list for MBS can even be included in the MBS configuration. In some other embodiments of the present application, the source BS may determine the cell list for MBS and transmit it to the UE after making CHO decision.

In step 507, the source BS may decide to use a CHO for the UE, i.e., making a CHO decision, which may be based on the measurement result reported by the UE.

Accordingly, in step 509, the source BS may transmit a CHO request message, e.g., a Handover Request message to the one or more neighbor BS s respectively.

In step 511, the one or more neighbor BSs may perform admission control to decide whether to allow the CHO of the UE after receiving the CHO request message from the source BS.

In step 513, based on the admission control result, at least one of the one or more neighbor BSs may transmit a CHO response message, e.g., a Handover Request Acknowledge message or a Handover Request Failure message to the source BS. Each CHO response message admitting the CHO may include CHO configuration for a corresponding cell. The source BS may determine a set of candidate cells for CHO for the UE based on the received CHO response message, for example only including the cells associated with Handover Request Acknowledge message.

In step 515, the source BS may transmit CHO configuration information to the UE. The CHO configuration information can be transmitted by a RRCReconfiguration message in some embodiments of the present application. The CHO configuration information indicates a set of execution conditions for the set of candidate cells, each execution condition being associated with a candidate cell. The set of execution condition may include one or two trigger conditions. For example, similar to the legacy technology, in the case that the execution condition includes one trigger condition, the trigger condition may be an A3 event or an A5 event as specified in 3GPP standard document TS38.331.

According to some embodiments of the present application, in response to receiving the CHO configuration information, in step 517, the UE may transmit a feedback message to the source BS, e.g., a RRCReconfigurationComplete message.

In step 519, the UE may maintain the connection with the source BS and start evaluating the set of execution conditions for the set of candidate cells. Before any execution condition is satisfied, when receiving a HO command without CHO configuration, the UE may perform the HO procedure regardless of any previously received CHO configuration information. Otherwise, in the case that at least one execution condition for at least one candidate cell is satisfied, in step 521, the UE may detach from the source BS and execute a CHO procedure to a candidate cell determined (or selected) from the at least one candidate cell. The determined candidate cell is the target cell.

According to some embodiments of the present application, during the target cell determination, the UE will prioritize the candidate cell(s) in the cell list for MBS when more than one execution condition is fulfilled. For example, both cell 1 and cell 2 (not shown) satisfy their respective execution condition indicated in the CHO configuration information, wherein cell 1 supports MBS or supports the ongoing MBS session(s) according to the cell list for MBS while cell 2 does not support. Accordingly, the UE will select cell 1 as the target cell. In some other embodiments of the present application, when more than one candidate cell in the cell list cell for MBS satisfies their respective execution conditions, the UE may prioritize the candidate cells supporting the ongoing MBS session(s). For example, both cell 1 and cell 2 may support MBS while only cell 1 supports the ongoing MBS session(s). The UE will select cell 1 as the target cell. In some other embodiments of the present application, when more than one candidate cell in the cell list cell for MBS satisfies their respective execution conditions, the UE may randomly select a target cell. Persons skilled in the art should understand that there are various selection mechanisms when more than one candidate cell in the cell list cell for MBS satisfies their respective execution conditions. The illustrated embodiments should not be used to limit the scope of the present application.

Figure 6:
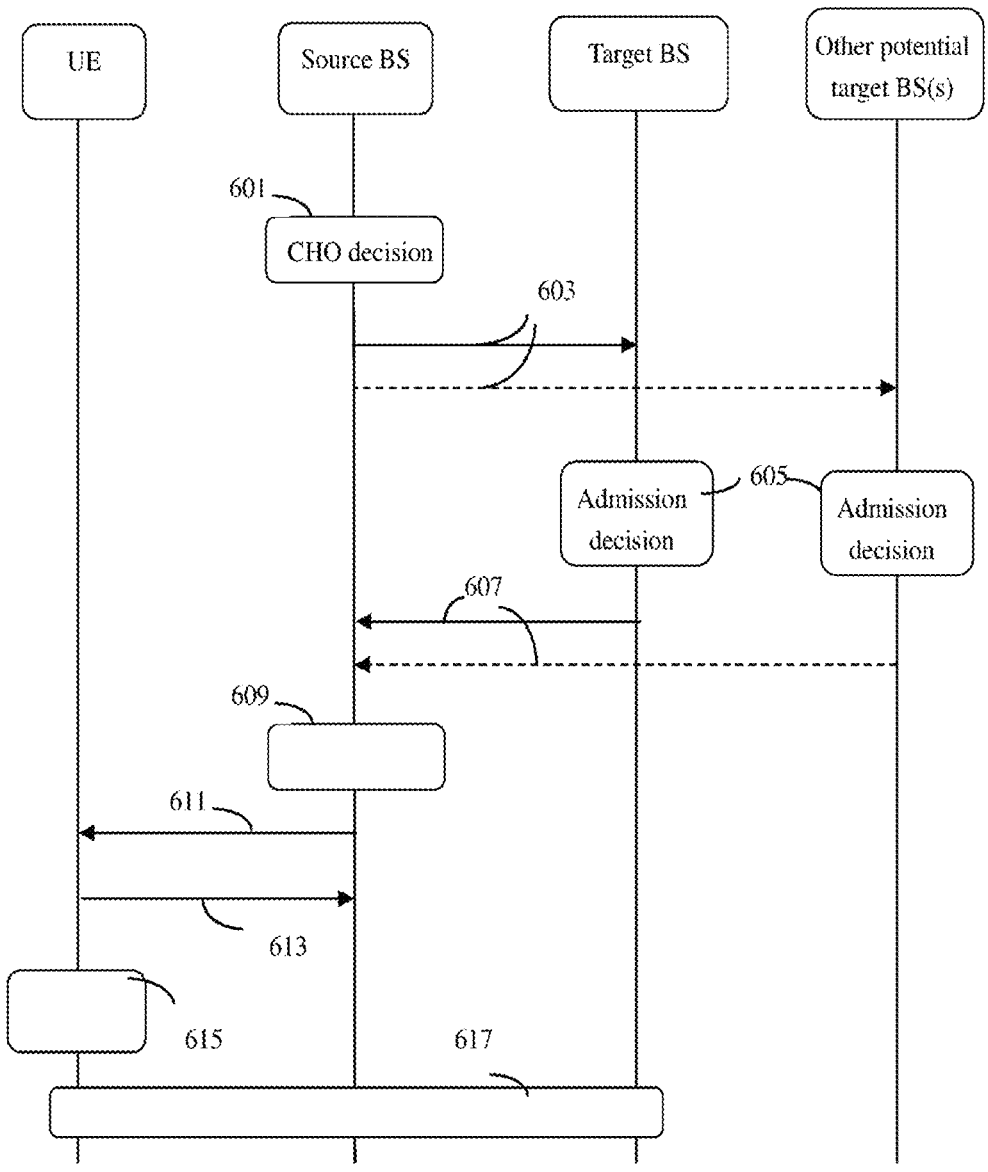
FIG. 6 is a flow chart illustrating an exemplary CHO procedure for multicast mobility in connected mode according to some other embodiments of the present application.

FIG. 6 is a flow chart illustrating an exemplary CHO procedure for multicast mobility in connected mode according to some other embodiments of the present application. Although the method is illustrated in a system level by a UE in a remote side (or UE side) and a plurality of BS in a network side (or BS side), persons skilled in the art can understand that the method implemented in the remote side and that implemented in the network side can be separately implemented and incorporated by other apparatus with the like functions.

Referring to FIG. 6, the source BS is assumed to be a BS by which the UE is served. Based on the measurement result reported by the UE, e.g., a RSRP report, the source BS may decide to use a CHO for the UE, i.e., making a CHO decision in step 601.

Accordingly, in step 603, the source BS may transmit a CHO request message, e.g., a Handover Request message to one or more neighbor BSs, which provide one or more neighbor cells. A set of candidate cells for CHO including a target cell (to be determined during a CHO procedure) and other potential target cell(s) will be determined or selected from the one or more neighbor cells. For simplicity, only the target BS of the target cell and one potential target BS of at least one potential target cell are shown in FIG. 6. Persons skilled in the art should understand that there may be more potential target BS or no other potential target BS.

According to some embodiments of the present application, the source BS may transmit MBS context to the one or more neighbor BSs to acquire information on at least one of MBS session and MBS bearer associated with each corresponding cell. The MBS context can be transmitted with the CHO request message or be transmitted via another Xn message.

In step 605, the one or more neighbor BSs may perform admission control to decide whether to allow the CHO of the UE after receiving the CHO request message from the source BS.

In step 607, based on the admission control result, at least one of the one or more neighbor BSs may transmit a CHO response message, e.g., a Handover Request Acknowledge message or a Handover Request Failure Acknowledge message to the source BS. Each CHO response message admitting the CHO may include CHO configuration for a corresponding cell.

The source BS may determine a set of candidate cells for CHO for the UE based on the received CHO response message in step 609, for example only including the cells associated with Handover Request Acknowledge message.

In the case that the source BS also transmit MBS context with the CHO request message, the CHO response message admitting the CHO may also include information on at least one of MBS session and MBS bearer associated with the corresponding cell. The information on at least one of MBS session and MBS bearer associated with the corresponding cell can also be transmitted to the source BS via another Xn message in some other embodiments of the present application. Based on the received information, the source BS may also determine the information on at least one of MBS session and MBS bearer associated with each candidate cell, i.e., MBS information associated with CHO, which may indicate at least one of the following: whether ongoing MBS session(s) is admitted by a candidate cell; whether ongoing MBS bearer(s) is admitted by the candidate cell; whether the ongoing MBS session(s) is kept in the candidate cell; and whether the ongoing MBS bearer(s) is kept in the candidate cell.

In some embodiments of the present application, the source BS may acquire the information on at least one of MBS session and MBS bearer associated with each candidate cell from the OAM of the network. In this case, it is no need to transmit MBS context to the one or more neighbor BS s.

In step 611, the source BS may transmit CHO configuration information to the UE. The CHO configuration information can be transmitted by a RRCReconfiguration message in some embodiments of the present application. The CHO configuration information indicates a set of execution conditions for the set of candidate cells, each execution condition being associated with a candidate cell. The set of execution condition may include one or two trigger conditions. For example, similar to the legacy technology, in the case that the execution condition includes one trigger condition, the trigger condition may be an A3 event or an A5 event as specified in 3GPP standard document TS38.331.

According to some embodiments of the present application, the source BS may also transmit MBS information associated with CHO via the message for CHO configuration information. In some embodiments of the present application, the MBS information associated with CHO may be even included in the CHO configuration information. In some other embodiments of the present application, the MBS information associated with CHO may be transmitted to the UE via another manner, e.g., via another RRC signaling or downlink control information (DCI) or MAC control element (MAC CE).

According to some embodiments of the present application, in response to receiving the CHO configuration information, in step 613, the UE may transmit a feedback message to the source BS, e.g., a RRCReconfigurationComplete message.

In step 615, the UE may maintain the connection with the source BS and start evaluating the set of execution conditions for the set of candidate cells. Before any execution condition is satisfied, when receiving a HO command without CHO configuration, the UE may perform the HO procedure regardless of any previously received CHO configuration information. Otherwise, in the case that at least one execution condition for at least one candidate cell is satisfied, in step 617, the UE may detach from the source BS and execute a CHO procedure to a candidate cell determined (or selected) from the at least one candidate cell. The determined candidate cell is the target cell.

According to some embodiments of the present application, during the target cell determination, the UE will prioritize the candidate cell(s) which admits the ongoing MBS session(s) or MBS bearer(s) when more than one execution condition is fulfilled. For example, both cell 1 and cell 2 (not shown) satisfy their respective execution conditions indicated in the CHO configuration information, wherein cell 1 admits the ongoing MBS session(s) or MBS bearer(s) while cell 2 does not admit. Accordingly, the UE will select cell 1 as the target cell. In some other embodiments of the present application, when more than one candidate cell satisfies their respective execution conditions and admits ongoing MBS session(s) or MBS bearer(s), the UE may randomly select a target cell. Persons skilled in the art should understand that there are various selection mechanisms when more than one candidate cell satisfies their respective execution condition and admitting (or keeping) ongoing MBS session(s) or MBS bearer(s) etc. The illustrated embodiments should not be used to limit the scope of the present application.

Figure 7:
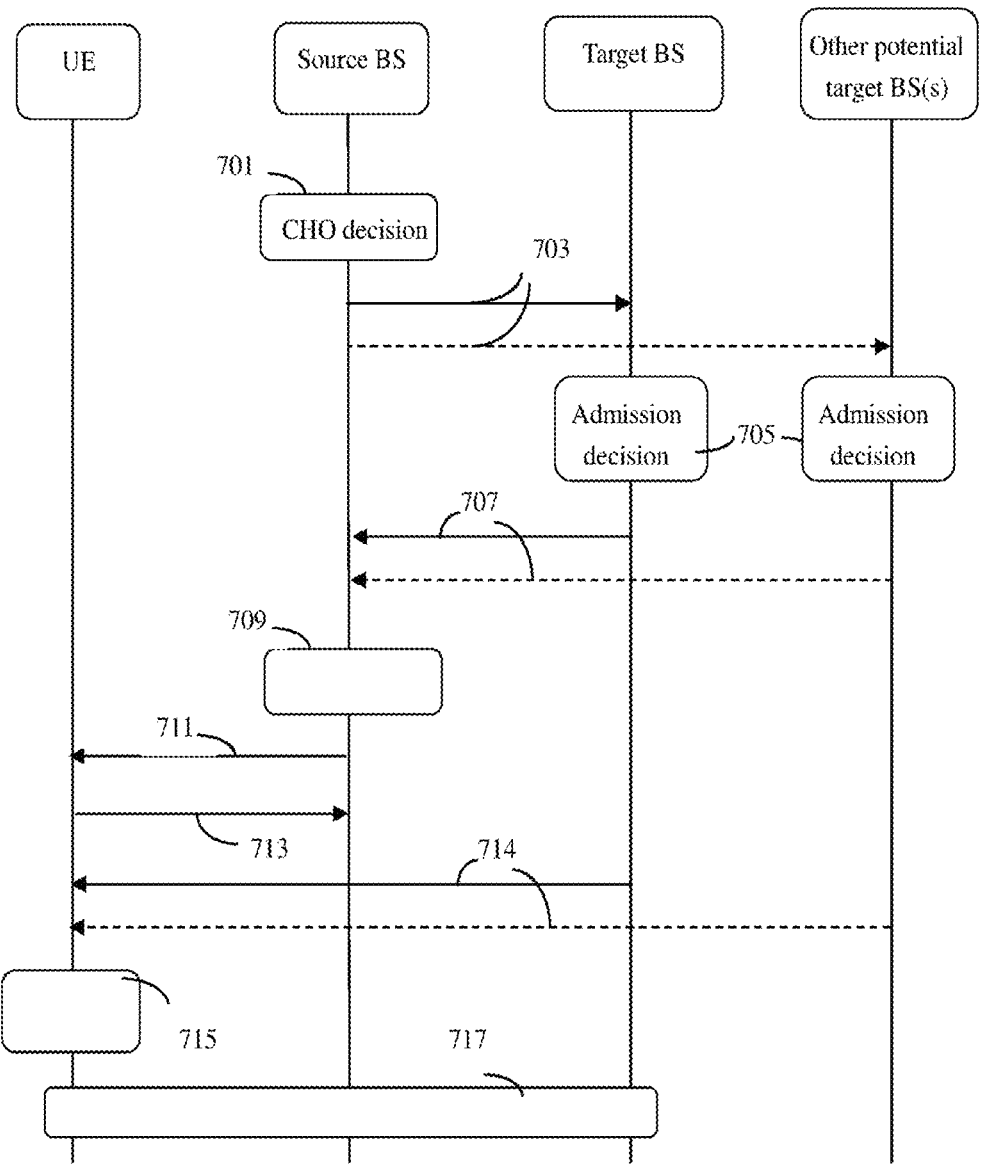
FIG. 7 is a flow chart illustrating an exemplary CHO procedure for multicast mobility in connected mode according to some yet other embodiments of the present application.

FIG. 7 is a flow chart illustrating an exemplary CHO procedure for multicast mobility in connected mode according to some yet other embodiments of the present application. Although the method is illustrated in a system level by a UE in a remote side (or UE side) and a plurality of BS in a network side (or BS side), persons skilled in the art can understand that the method implemented in the remote side and that implemented in the network side can be separately implemented and incorporated by other apparatus with the like functions.

Referring to FIG. 7, the source BS is assumed to be a BS by which the UE is served. Based on the measurement result reported by the UE, e.g., a RSRP report, the source BS may decide to use a CHO for the UE, i.e., making a CHO decision in step 701.

Accordingly, in step 703, the source BS may transmit a CHO request message, e.g., a Handover Request message to one or more neighbor BSs, which provide one or more neighbor cells. A set of candidate cells for CHO including a target cell (to be determined during a CHO procedure) and other potential target cell(s) will be determined or selected from the one or more neighbor cells. For simplicity, only the target BS of the target cell and one potential target BS of at least one potential target cell are shown in FIG. 7. Persons skilled in the art should understand that there may be more potential target BS or no other potential target BS.

In step 705, the one or more neighbor BSs may perform admission control to decide whether to allow the CHO of the UE after receiving the CHO request message from the source BS.

In step 707, based on the admission control result, at least one of the one or more neighbor BSs may transmit a CHO response message, e.g., a Handover Request Acknowledge message or a Handover Request Failure Acknowledge message to the source BS. Each CHO response message admitting the CHO may include CHO configuration for a corresponding cell.

The source BS may determine a set of candidate cells for CHO for the UE based on the received CHO response message in step 709, for example only including the cells associated with Handover Request Acknowledge message.

In step 711, the source BS may transmit CHO configuration information to the UE. The CHO configuration information can be transmitted by a RRCReconfiguration message in some embodiments of the present application. The CHO configuration information indicates a set of execution conditions for the set of candidate cells, each execution condition being associated with a candidate cell. The set of execution condition may include one or two trigger conditions. For example, similar to the legacy technology, in the case that the execution condition includes one trigger condition, the trigger condition may be an A3 event or an A5 event as specified in 3GPP standard document TS38.331.

According to some embodiments of the present application, in response to receiving the CHO configuration information, in step 713, the UE may transmit a feedback message to the source BS, e.g., a RRCReconfigurationComplete message.

In addition, although being served by the source BS, the UE may also acquire MBS information from neighbor cells by itself in step 714, which may be the same as or different from the candidate cells. The MBS information received from the neighbor cells may be SIB or MCCH associated with a corresponding cell, which may provide common MBS configuration of the corresponding neighbor cell.

In step 715, the UE may maintain the connection with the source BS and start evaluating the set of execution conditions for the set of candidate cells. Before any execution condition is satisfied, when receiving a HO command without CHO configuration, the UE may perform the HO procedure regardless of any previously received CHO configuration information. Otherwise, in the case that at least one execution condition for at least one candidate cell is satisfied, in step 717, the UE may detach from the source BS and execute a CHO procedure to a candidate cell determined (or selected) from the at least one candidate cell. The determined candidate cell is the target cell.

According to some embodiments of the present application, during the target cell determination, the UE will also consider the MBS information received from the neighbor cells. The UE will prioritize the candidate cell(s) from which MBS information is also received when more than one execution condition is fulfilled. For example, both cell 1 and cell 2 (not shown) satisfy their respective execution conditions indicated in the CHO configuration information, and the UE also receives SIB or MCCH from cell 1 while does not receive SIB or MCCH from cell 2. Accordingly, the UE will select cell 1 as the target cell. In some other embodiments of the present application, when more than one candidate cell satisfies their respective execution conditions and their MBS information is received, the UE may randomly select a target cell. Persons skilled in the art should understand that there are various selection mechanisms when more than one candidate cell satisfies their respective execution conditions and their MBS information is received. The illustrated embodiments should not be used to limit the scope of the present application.

In the above embodiments illustrated in FIGS. 5-7, during the target cell determination, the UE will also consider the MBS information received from the neighbor cells, and accordingly MBS service possibility will be increased and MBS service interruption will be reduced. In some other embodiments, when determining the candidate cell(s) indicated to the UE for CHO by the source BS, MBS information associated with CHO has been considered. The UE can select the target cell only based on execution conditions, i.e., in a manner similar to legacy technology.

Figure 8:
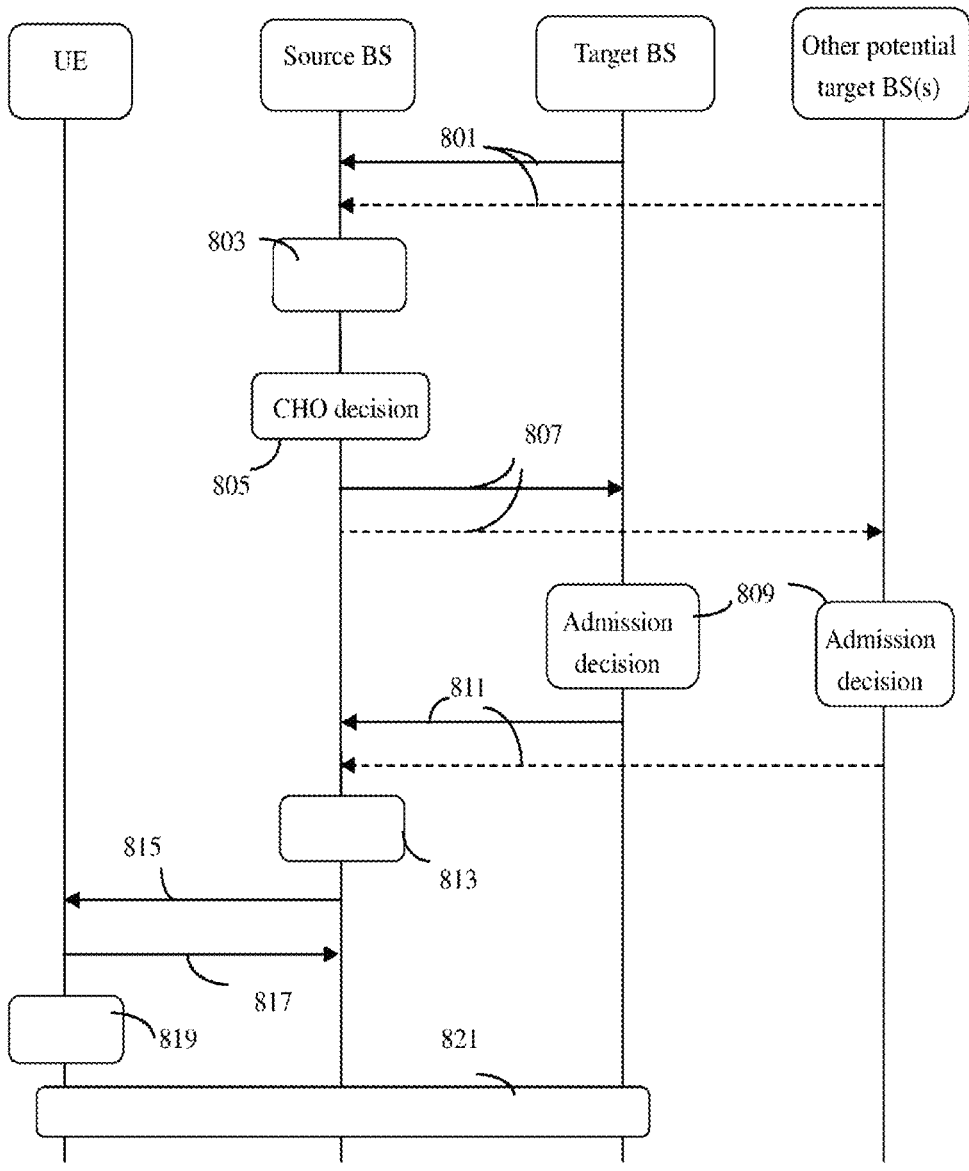
FIG. 8 is a flow chart illustrating an exemplary CHO procedure for multicast mobility in connected mode according to some yet other embodiments of the present application.

FIG. 8 is a flow chart illustrating an exemplary CHO procedure for multicast mobility in connected mode according to some yet other embodiments of the present application. Although the method is illustrated in a system level by a UE in a remote side (or UE side) and a plurality of BS in a network side (or BS side), persons skilled in the art can understand that the method implemented in the remote side and that implemented in the network side can be separately implemented and incorporated by other apparatus with the like functions.

Referring to FIG. 8, the source BS is assumed to be a BS by which the UE is served. In step 801, the source BS may receive MBS information from one or more neighbor BS s, which provide one or more neighbor cells. A set of candidate cells for CHO including a target cell (to be determined during a CHO procedure) and other potential target cell(s) will be determined or selected from the one or more neighbor cells. For simplicity, only the target BS of the target cell and one potential target BS of at least one potential target cell are shown in FIG. 8. Persons skilled in the art should understand that there may be more potential target BS or no other potential target BS. In some embodiments of the present application, the source BS may receive MBS information from a neighbor BS associated with a neighbor cell via a Xn message, which indicates at least one of the following: e.g., whether the neighbor cell supports MBS, whether the neighbor cell has ongoing MBS session(s), whether the neighbor cell has MBS SAI(s); whether the neighbor cell also provides ongoing MBS session(s) provided in current cell(s).

Based on the received MBS information from each neighbor BS, the source BS may determine the MBS information associated with CHO in step 803. In some embodiments of the present application, the source BS may acquire (or receive) the MBS information of each neighbor cell from OAM. The received or acquired MBS information can be directly used as MBS information associated with CHO in some embodiments of the present application. In some other embodiments of the present application, the source BS may derive the MBS information associated with CHO from the received or acquired MBS information. An exemplary MBS information associated with CHO is a cell list for MBS including at least one of the following: a list of cells supporting MBS; a list of cells with ongoing MBS session(s); a list of cells with MBS SAI(s); and a list of cells where ongoing MBS session(s) provided in current cell(s) is also provided.

In step 805, the source BS may decide to use a CHO for the UE, i.e., making a CHO decision, which may be based on the measurement result reported by the UE.

Accordingly, in step 807, the source BS may transmit a CHO request message, e.g., a Handover Request message to one or more neighbor BSs respectively. In some other embodiments of the present application, the source BS may only send CHO request message(s) to the neighbor BS(s) of cell(s) in the cell list for MBS.

In step 809, the one or more neighbor BSs may perform admission control to decide whether to allow the CHO of the UE after receiving the CHO request message from the source BS.

In step 811, based on the admission control result, at least one of the one or more neighbor BSs may transmit a CHO response message, e.g., a Handover Request Acknowledge message or a Handover Request Failure Acknowledge message to the source BS. Each CHO response message admitting the CHO may include CHO configuration for a corresponding cell.

The source BS may determine a set of candidate cells for CHO for the UE based on the received CHO response message and MBS information associated with CHO in step 813. For example, the candidate cells are the cells transmitting Handover Request Acknowledge message and being included in the cell list for MBS. In the case that the source BS only sent CHO request message(s) to the neighbor BS(s) of cell(s) in the cell list for MBS, the source BS only needs to consider whether Handover Request Acknowledge message is received in step 813.

In step 815, the source BS may transmit CHO configuration information to the UE. The CHO configuration information can be transmitted by a RRCReconfiguration message in some embodiments of the present application. The CHO configuration information indicates a set of execution conditions for the set of candidate cells, each execution condition being associated with a candidate cell. The set of execution condition may include one or two trigger conditions. For example, similar to the legacy technology, in the case that the execution condition includes one trigger condition, the trigger condition may be an A3 event or an A5 event as specified in 3GPP standard document TS38.331.

According to some embodiments of the present application, in response to receiving the CHO configuration information, in step 817, the UE may transmit a feedback message to the source BS, e.g., a RRCReconfigurationComplete message.

In step 819, the UE may maintain the connection with the source BS and start evaluating the set of execution conditions for the set of candidate cells. Before any execution condition is satisfied, when receiving a HO command without CHO configuration, the UE may perform the HO procedure regardless of any previously received CHO configuration information. Otherwise, in the case that at least one execution condition for at least one candidate cell is satisfied, in step 821, the UE may detach from the source BS and execute a CHO procedure to a candidate cell determined (or selected) from the at least one candidate cell. The determined candidate cell is the target cell. Since the candidate cell(s) is selected based on MBS information associated with CHO, the UE can only select the target cell from the candidate cell(s) based on the execution conditions in a manner similar to legacy technology, which can also increase MBS service possibility and reduce MBS interruption for the UE.

Figure 9:
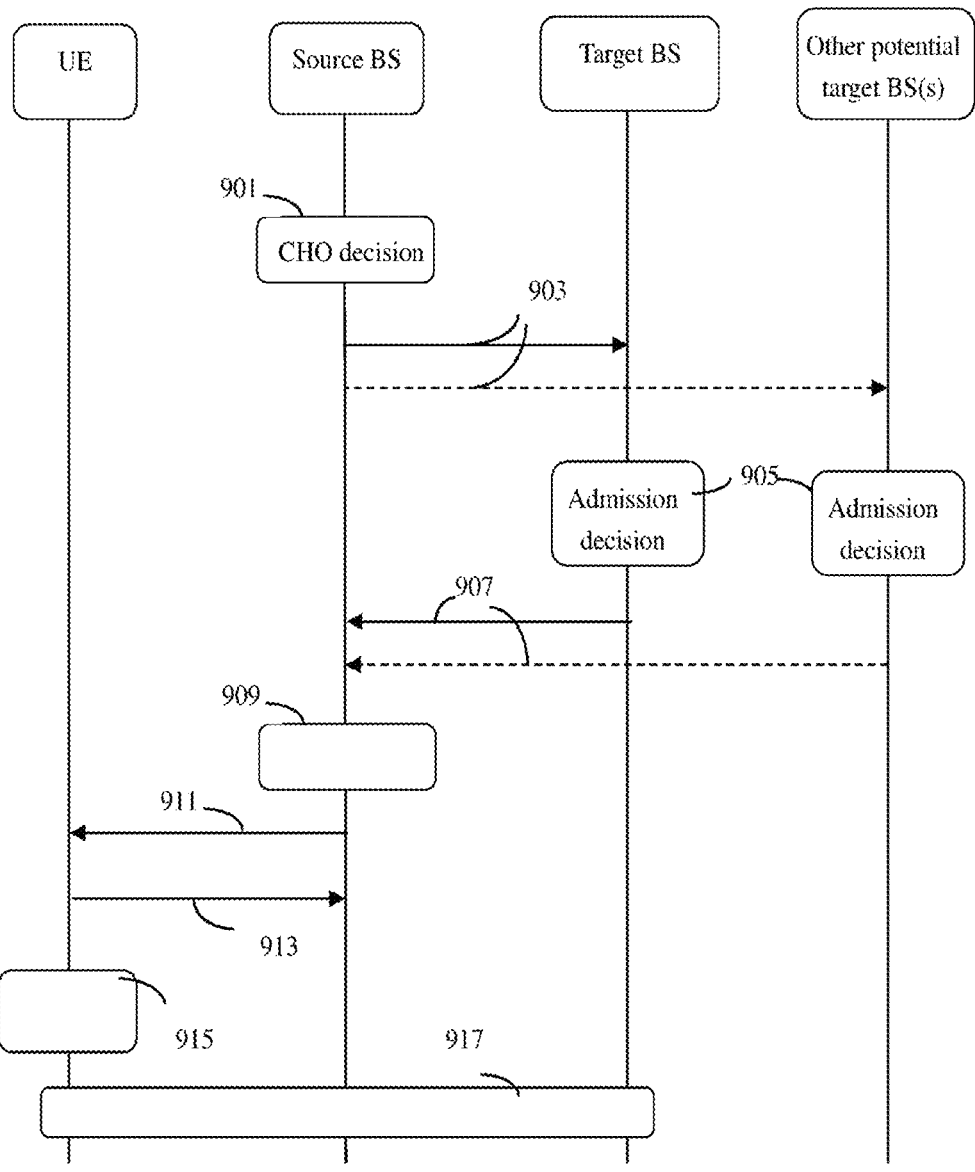
FIG. 9 is a flow chart illustrating an exemplary CHO procedure for multicast mobility in connected mode according to some yet other embodiments of the present application.

FIG. 9 is a flow chart illustrating an exemplary method for MBS according to some other embodiments of the present application. Although the method is illustrated in a system level by a UE in a remote side (or UE side) and a plurality of BS in a network side (or BS side), persons skilled in the art can understand that the method implemented in the remote side and that implemented in the network side can be separately implemented and incorporated by other apparatus with the like functions.

Referring to FIG. 9, the source BS is assumed to be a BS by which the UE is served. Based on the measurement result reported by the UE, e.g., a RSRP report, the source BS may decide to use a CHO for the UE, i.e., making a CHO decision in step 901.

Accordingly, in step 903, the source BS may transmit a CHO request message, e.g., a Handover Request message to one or more neighbor BSs, which provide one or more neighbor cells. A set of candidate cells for CHO including a target cell (to be determined during a CHO procedure) and other potential target cell(s) will be determined or selected from the one or more neighbor cells. For simplicity, only the target BS of the target cell and one potential target BS of at least one potential target cell are shown in FIG. 9. Persons skilled in the art should understand that there may be more potential target BS or no other potential target BS.

According to some embodiments of the present application, the source BS may transmit MBS context to the one or more neighbor BSs to acquire information on at least one of MBS session and MBS bearer associated with each corresponding cell. The MBS context can be transmitted with the CHO request message or be transmitted via another Xn message.

In step 905, the one or more neighbor BSs may perform admission control to decide whether to allow the CHO of the UE after receiving the CHO request message from the source BS.

In step 907, based on the admission control result, at least one of the one or more neighbor BSs may transmit a CHO response message, e.g., a Handover Request Acknowledge message or a Handover Request Failure Acknowledge message to the source BS. Each CHO response message admitting the CHO may include CHO configuration for a corresponding cell.

In the case that the source BS also transmit MBS context with the CHO request message, the CHO response message admitting the CHO may also include information on at least one of MBS session and MBS bearer associated with the corresponding cell. The information on at least one of MBS session and MBS bearer associated with the corresponding cell can also be transmitted to the source BS via another Xn message in some other embodiments of the present application. Based on the received information, the source BS may also determine the information on at least one of MBS session and MBS bearer associated with each candidate cell, i.e., MBS information associated with CHO. The MBS information associated with CHO may indicate at least one of the following: whether ongoing MBS session(s) is admitted by a candidate cell; whether ongoing MBS bearer(s) is admitted by the candidate cell; whether the ongoing MBS session(s) is kept in the candidate cell; and whether the ongoing MBS bearer(s) is kept in the candidate cell.

In some embodiments of the present application, the source BS may acquire the information on at least one of MBS session and MBS bearer associated with each candidate cell from the OAM of the network. In this case, it is no need to transmit MBS context to the one or more neighbor BSs.

The source BS may determine a set of candidate cells for CHO for the UE based on the received CHO response message and MBS information associated with CHO in step 909. For example, the candidate cells are the cells transmitting Handover Request Acknowledge message and admitting ongoing MBS session(s) or MBS bearer(s) etc.

In step 911, the source BS may transmit CHO configuration information to the UE. The CHO configuration information can be transmitted by a RRCReconfiguration message in some embodiments of the present application. The CHO configuration information indicates a set of execution conditions for the set of candidate cells, each execution condition being associated with a candidate cell. The set of execution condition may include one or two trigger conditions. For example, similar to the legacy technology, in the case that the execution condition includes one trigger condition, the trigger condition may be an A3 event or an A5 event as specified in 3GPP standard document TS38.331.

According to some embodiments of the present application, in response to receiving the CHO configuration information, in step 913, the UE may transmit a feedback message to the source BS, e.g., a RRCReconfigurationComplete message.

In step 915, the UE may maintain the connection with the source BS and start evaluating the set of execution conditions for the set of candidate cells. Before any execution condition is satisfied, when receiving a HO command without CHO configuration, the UE may perform the HO procedure regardless of any previously received CHO configuration information. Otherwise, in the case that at least one execution condition for at least one candidate cell is satisfied, in step 917, the UE may detach from the source BS and execute a CHO procedure to a candidate cell determined (or selected) from the at least one candidate cell. The determined candidate cell is the target cell. Since the candidate cell(s) is selected based on MBS information associated with CHO, the UE can only select the target cell from the candidate cell(s) based on the execution conditions, which can also increase MBS service possibility and reduce MBS interruption for the UE.

Embodiments of the present application also propose an apparatus for MBS. For example, FIG. 10 illustrates a block diagram of an apparatus 1000 for MBS according to some embodiments of the present application.

Figure 10:
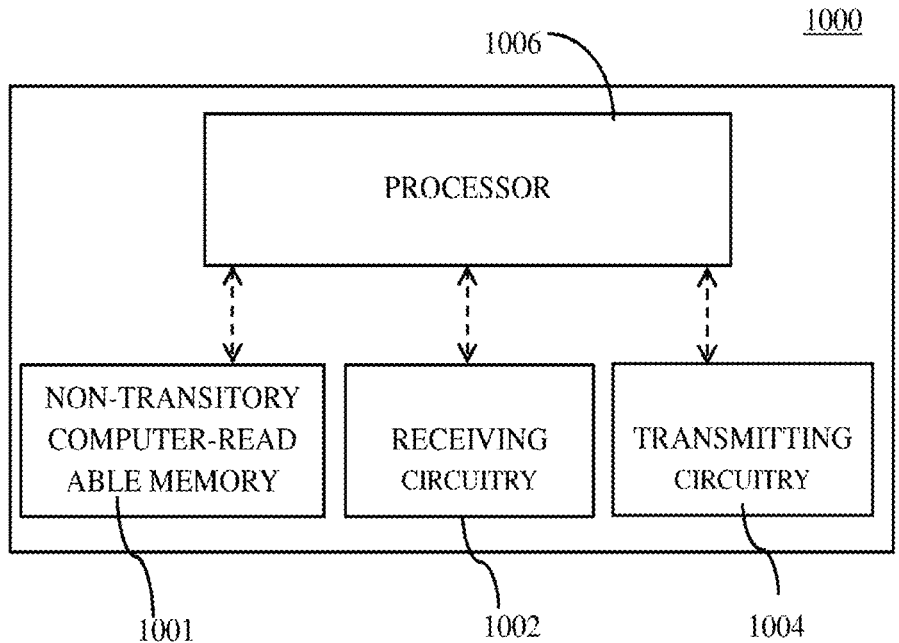
FIG. 10 illustrates a block diagram of an exemplary apparatus according to some embodiments of the present application.

As shown in FIG. 10, the apparatus 1000 may include at least one non-transitory computer-readable medium 1001, at least one receiving circuitry 1002, at least one transmitting circuitry 1004, and at least one processor 1006 coupled to the non-transitory computer-readable medium 1001, the receiving circuitry 1002 and the transmitting circuitry 1004. The apparatus 1000 may be a network side apparatus (e.g., a BS) configured to perform a method illustrated in any of FIGS. 4-9, or the like, or a remote unit (e.g., a UE) configured to perform a method illustrated in any of FIGS. 3-9, or the like.

Although in this figure, elements such as the at least one processor 1006, transmitting circuitry 1004, and receiving circuitry 1002 are described in the singular, the plural is contemplated unless a limitation to the singular is explicitly stated. In some embodiments of the present application, the receiving circuitry 1002 and the transmitting circuitry 1004 can be combined into a single device, such as a transceiver. In certain embodiments of the present application, the apparatus 1000 may further include an input device, a memory, and/or other components.

For example, in some embodiments of the present application, the non-transitory computer-readable medium 1001 may have stored thereon computer-executable instructions to cause a processor to implement the method with respect to the UE as described above. For example, the computer-executable instructions, when executed, cause the processor 1006 interacting with receiving circuitry 1002 and transmitting circuitry 1004, so as to perform the steps with respect to the UE depicted in any of FIGS. 3-9.

In some embodiments of the present application, the non-transitory computer-readable medium 1001 may have stored thereon computer-executable instructions to cause a processor to implement the method with respect to the BS as described above. For example, the computer-executable instructions, when executed, cause the processor 1006 interacting with receiving circuitry 1002 and transmitting circuitry 1004, so as to perform the steps with respect to the BS depicted in any of FIGS. 4-9.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for MBS, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A user equipment (UE) for wireless communication, comprising:
at least one memory; and
at least one processor coupled with the at least one memory and configured to cause the UE to:
receive conditional handover (CHO) configuration information, wherein the CHO configuration information indicates a set of execution conditions for a set of candidate cells, each execution condition being associated with a candidate cell;
select a target cell from the set of candidate cells for a CHO procedure based on multicast and broadcast services (MBS) information associated with CHO and the set of execution conditions; and execute the CHO procedure to the target cell in response to at least one of the set of execution conditions being met.

2. The UE of claim 1, wherein the MBS information associated with CHO is a cell list for MBS including at least one of:
a list of cells supporting MBS;
a list of cells with an ongoing MBS session;
a list of cells with an MBS service/session area identity (SAI); or
a list of cells where an ongoing MBS session provided in a current cell is provided.

3. The UE of claim 2, wherein the at least one processor is further configured to cause the UE to:
receive the MBS information associated with CHO via a message for MBS configuration.

4. The UE of claim 1, wherein the MBS information associated with CHO comprises information on at least one of an MBS session or an MBS bearer associated with each candidate cell, and comprising at least one of:
whether an ongoing MBS session is admitted by a candidate cell;
whether an ongoing MBs bearer is admitted by the candidate cell;
whether the ongoing MBS session is kept in the candidate cell; or
whether the ongoing MBS bearer is kept in the candidate cell.

5. The UE of claim 4, wherein the at least one processor is further configured to cause the UE to:
receive the MBS information associated with CHO via a message for the CHO configuration information.

6. The UE of claim 4, wherein the at least one processor is further configured to cause the UE to;
determine the set of candidate cells based on the MBS information associated with CHO; and
determine the target cell from the set of candidate cells based on the set of execution conditions.

7. The UE of claim 1, wherein the MBS information associated with CHO comprises one or more of system information block (SIB) or multicast control channel (MCCH) received from different cells.

8. A base station (BS) for wireless communication, comprising:
at least one memory; and
at least one processor coupled with the at least one memory and configured to cause the BS to:
determine multicast and broadcast services (MBS) information associated with conditional handover (CHO); and
transmit CHO configuration information, wherein the CHO configuration information indicates a set of execution conditions for a set of candidate cells, each execution condition being associated with a respective candidate cell.

9. The BS of claim 8, wherein the MBS information associated with CHO comprises a cell list for MBS including at least one of:
a list of cells supporting MBS;
a list of cells with an ongoing MBS session;
a list of cells with an MBS service/session area identity; or
a list of cells where an ongoing MBS session provided in a current cell is provided.

10. The BS of claim 9, wherein the at least one processor is further configured to cause the BS to:
transmit the MBS information associated with CHO via a message for MBS configuration.

11. The BS of claim 8, wherein the MBS information associated with CHO comprises information on at least one of an MBS session or an MBS bearer associated with each candidate cell, and comprises at least one of:
whether an ongoing MBS session is admitted by a candidate cell;
whether ongoing an ongoing MBS bearer is admitted by the candidate cell;
whether the ongoing MBS session is kept in the candidate cell; or
whether the ongoing MBS bearer is kept in the candidate cell.

12. The BS of claim 11, wherein the at least one processor is further configured to cause the BS to:
transmit the MBS information associated with CHO via a message for transmitting the CHO configuration information.

13. The BS of claim 11, wherein the at least one processor is further configured to cause the BS to:
determine the set of candidate cells based on the MBS information associated with CHO.

14. The BS of claim 11, wherein the at least one processor is further configured to cause the BS to:
receive the MBS information associated with CHO from at least one of one or more BSs of the set of candidate cells or from operations, administration and maintenance (OAM).

15. A method performed by a user equipment (UE), the method comprising:
receiving conditional handover (CHO) configuration information, wherein the CHO configuration information indicates a set of execution conditions for a set of candidate cells, each execution condition being associated with a candidate cell;
selecting a target cell from the set of candidate cells for a CHO procedure based on multicast and broadcast services (MBS) information associated with CHO and the set of execution conditions; and executing the CHO procedure to the target cell in response to at least one of the set of execution conditions is met.

16. The method of claim 15, wherein the MBS information associated with CHO is a cell list for MBS comprising one or more of:
a list of cells supporting MBS;
a list of cells with an ongoing MBS session;
a list of cells with an MBS service/session area identity (SAI); or
a list of cells where an ongoing MBS session provided in a current cell is provided.

17. The method of claim 16, further comprising:
receiving the MBS information associated with CHO via a message for MBS configuration.

18. The method of claim 16, wherein the MBS information associated with CHO comprises information on at least one of an MBS session or an MBS bearer associated with each candidate cell, and comprising one or more of:
whether an ongoing MBS session is admitted by a candidate cell;
whether an ongoing MBS bearer is admitted by the candidate cell;
whether the ongoing MBS session is kept in the candidate cell; or
whether the ongoing MBS bearer is kept in the candidate cell.

19. The method of claim 18, further comprising:
receiving the MBS information associated with CHO via a message for the CHO configuration information.

20. A method performed by a base station (BS), the method comprising:
determining multicast and broadcast services (MBS) information associated with conditional handover (CHO); and
transmitting CHO configuration information, wherein the CHO configuration information indicates a set of execution conditions for a set of candidate cells, each execution condition being associated with a respective candidate cell.

* * * * *